(12) United States Patent
Kwong

(10) Patent No.: US 6,947,056 B2
(45) Date of Patent: Sep. 20, 2005

(54) LOW POWER, VARIABLE PRECISION DDA FOR 3D GRAPHICS APPLICATIONS

(75) Inventor: Mark J. Kwong, Santa Clara, CA (US)

(73) Assignee: LSI Logic Corporation, Milpitas, GA (US)

(*) Notice: Subject to any disclaimer, the term of this patent is extended or adjusted under 35 U.S.C. 154(b) by 346 days.

(21) Appl. No.: 10/396,648

(22) Filed: Mar. 25, 2003

(65) Prior Publication Data

US 2004/0189673 A1 Sep. 30, 2004

(51) Int. Cl.[7] .............................. G09G 5/00; G06T 1/00
(52) U.S. Cl. ...................... 345/605; 345/428; 345/626; 708/102
(58) Field of Search ................................ 345/605, 428, 345/626; 708/102

(56) References Cited

U.S. PATENT DOCUMENTS 4,821,208 A * 4/1989 Ryan et al. ................. 345/550
5,923,577 A * 7/1999 Wong et al. ................ 708/501
2003/0132940 A1 * 7/2003 Yamagata et al. .......... 345/505
2003/0212726 A1 * 11/2003 Luick ......................... 708/501

OTHER PUBLICATIONS

Hao, Xuejun and Varshney, Amitabh: "Variable–Precision Rendering" Mar. 2001, ACM Press, Proceedings of the 2001 symposium on Interactive 3D graphics, pp. 149–158.*

* cited by examiner

Primary Examiner—Richard Hjerpe
Assistant Examiner—Blake Betz
(74) Attorney, Agent, or Firm—Christopher P. Maiorana, P.C.

(57) ABSTRACT

An apparatus generally having a register, an adder circuit and a mask circuit is disclosed. The register may be configured to replace a current value with a new value in response to a clock value. The adder circuit may be configured to generate the new value by adding the current value to a delta value. The mask circuit may be configured to mask at least one value among the delta value, the new value and the clock value in response to a mask value having a plurality of bits.

20 Claims, 3 Drawing Sheets

LOW POWER, VARIABLE PRECISION DDA FOR 3D GRAPHICS APPLICATIONS

FIELD OF THE INVENTION

The present invention relates to digital differential adders generally and, more particularly, to a low power, variable precision digital differential adder and/or architecture for three-dimensional graphics applications.

BACKGROUND OF THE INVENTION

Many three-dimensional (3D) triangle rendering engines exist today for the desktop/workstation/console market, but a 3D rendering engine for handheld systems is not yet prevalent. A barrier in creating a 3D engine for a handheld system is a power constraint. The 3D engine in a handheld system should be optimized for power over performance. However, conventional 3D engines are implemented with digital differential adders (DDA) using high speed adders with carry select, propagate/generate, etc. Therefore, the conventional DDA designs consume an unsatisfactory amount of power.

SUMMARY OF THE INVENTION

The present invention concerns an apparatus generally having a register, an adder circuit and a mask circuit. The register may be configured to replace a current value with a new value in response to a clock value. The adder circuit may be configured to generate the new value by adding the current value to a delta value. The mask circuit may be configured to mask at least one value among the delta value, the new value and the clock value in response to a mask value having a plurality of bits.

The objects, features and advantages of the present invention include providing a digital differential adder and/or architecture that may (i) be implemented with low power, (ii) provide a variable precision adder that shuts off lower significant bits and/or (iii) calculates using a variable precision to maintain accuracy while minimizing power.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
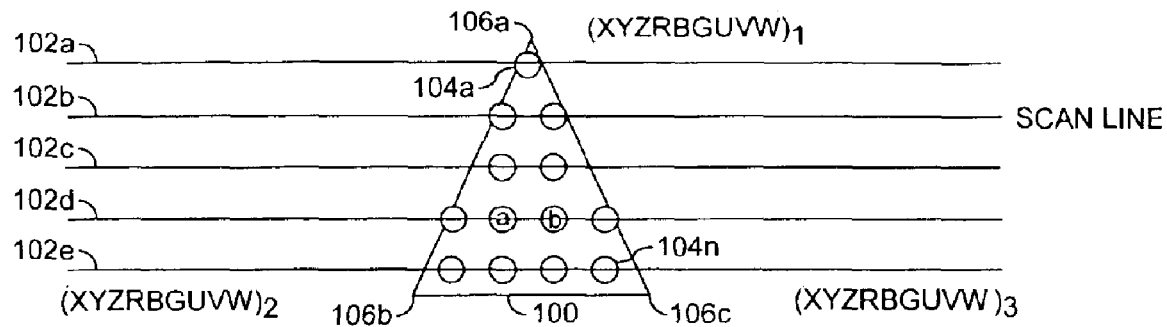
FIG. 1 is a diagram illustrating a rendering of a triangle on scan lines.

Referring to FIG. 1, a diagram illustrating a rendering of a triangle 100 on scan lines 102a–e is shown. The rendering of the triangle 100 generally comprises one or more pixels 104a–n on each of the scan lines 102a–e. In three-dimensional (3D) graphics, each pixel 104a–n rendered to a screen generally has a variety of associated parameters. The parameters may include, but are not limited to, color values (e.g., red, green, blue (RGB)), texture values (e.g., 2D–3D mapping (UVW)) and a depth value (e.g., Z). For each pixel 104a–n, a new value for each parameter (RGBUVWZ) may be calculated as the triangle 100 is rendered.

A 3D rendering operation for the triangle 100 generally works from the parameters found at each vertex 106a–c of the triangle 100. Pixel values inside the triangle 100 may be calculated by first calculating parameter gradients and then using the gradients to iteratively interpolate a value of each parameter from pixel 104 to pixel 104. The calculations may be performed in a pipeline fashion where a new value for each parameter (e.g., P, where P is R, G, B, U, V, W or Z) may be generated every cycle. The pipeline approach generally comprises multiple digital differential adders (DDA), one adder for each parameter of the triangle 100.

A parameter P may be calculated from a first pixel 104 (e.g., pixel "a") to a second pixel 104 (e.g., pixel "b") by adding a step or delta value (e.g., dP/dX) for that parameter as shown in equation 1 as follows:

$$P_{NEXT} = P_{CURRENT} + dP/dX \qquad \text{Eq. (1)}$$

Adding the delta value dP/dX may be repeated for each pixel 104 on a scan line 102. A pipeline involving seven parameters RGBUVWZ per pixel 104a–n may implement seven adders so that all of the parameters for a pixel 104a–n may be generated during every cycle of the pipeline. The additions are generally a highly repeated operation and thus the DDAs may be an ideal circuit to optimize for power consumption.

The precision of the delta value dP/dX, and thus the adders, should be large enough to avoid accumulating errors after repeated iterations across the scan lines 102a–e. In assuming worst case dimensions of the triangle 100, the delta value dP/dX may extend several bits of precision (e.g., 12 bits) beyond the decimal place in the parameter (e.g., BBBBBBBB.BBBBBBBBBBBB, where B is a bit). Therefore, the adder may be implemented with sufficient accuracy to handle the worst case situation. Typically, the triangle 100 may have a modest size, for example 10 bits by 10 bits. Therefore, the precision of the delta value dP/dX may be less than the worst case precision and still maintain sufficient accuracy throughout the iterations for the triangle 100.

If a delta value (e.g., $dP/dX_{FIXED}$) is limited to a fixed precision number by a circuit design, an error term (e.g., ERROR) may be associated with the fixed delta value as shown in equation 2 as follows:

$$dP/dX_{FIXED} = dP/dX + \text{ERROR} \qquad \text{Eq. (2)}$$

The error term ERROR may be due to the fixed precision representation of a true gradient (e.g., dP/dX) for the parameter P. A total accumulated error (e.g., $E_{TOTAL}$) may be determined base upon a number of pixels (e.g., N) across the triangle 100 along any given scan line 102 by equation 3 as follows:

$$E_{TOTAL} = N \times \text{ERROR} \qquad \text{Eq. (3)}$$

As N becomes large (e.g., 500 pixels), the total error $E_{TOTAL}$ may become significant.

To fix the maximum total error $E_{TOTAL}$ to be less than ±½ units from an error-free solution, the precision of the error value ERROR may be defined by equation 4 as follows:

$$\text{ERROR} < 1/(2 \times N) \qquad \text{Eq. (4)}$$

Therefore, a decimal fraction for each parameter P may be implemented with a number of bits (e.g., K) to the right of a decimal point, where the number of bits K may be defined by equation 5 as follows:

$$K = \ln(2 \times N)/\ln(2) \qquad \text{Eq. (5)}$$

For example, to achieve a maximum total error $E_{TOTAL} < \pm \frac{1}{2}$ for N=500 pixels, the number of bits in the decimal fraction K should be at least 10. The total number of bits used to represent the delta value dP/dX is generally the number of bits K plus additional bits (e.g., 8 additional bits) to the left of the decimal point, illustrated as dP/dX= BBBBBBBB.$B_1B_2B_3B_4B_5B_6B_7B_8B_9B_{10}$. Therefore, each example adder may be implemented with at least 18 bits to accommodate rendering a large triangle 100. For larger maximum numbers of pixels N across the triangle 100 and/or smaller total error values $E_{TOTAL}$, the number of bits K in the decimal fraction may be increased. Other total numbers of bits may be implemented to meet a criteria of a particular application.

In another example, an average triangle 100 that may be rendered to a screen may have a maximum width of 10 pixels 104*a–n*. From equations 3–5: $E_{TOTAL} < 10 \times \text{ERROR}$, E<1/20 and so K=5. The delta value dP/dX may be illustrated as dP/dX=BBBBBBBB.$B_1B_2B_3B_4B_5$. A lower number of bits K may be used to implement a lower power adder solution where less signal nets or nodes may be switched on each clock cycle. Each of the adders for each of the parameters P may save power by adding numbers having effectively smaller widths.

Several methods may be used to calculate the number of bits K to implement. In a scan-line-per-scan-line method, a new precision size for each parameter P may be calculated based upon a width of the triangle 100 across a particular scan line 102 being rendered. In a per-triangle method, a single precision size may be calculated for the entire triangle 100.

In FIG. 1, the first scan line 102*a* may have an inter-pixel width of zero. The second and the third scan lines 102*b–c* may have an inter-pixel width of one. The fourth and the fifth scan lines 102*d–e* may have an inter-pixel width of three. During a rendering process, a start value (e.g., $X_{START}$) and an end value (e.g., $X_{END}$) may be calculated. A subtraction may be used to calculate a width value (e.g., $X_{WIDTH}$) for a current scan line 102 as shown in equation 6 as follows:

$$X_{WIDTH} = X_{END} - X_{START} \qquad \text{Eq. (6)}$$

In some implementations of a pixel renderer, the width value $X_{WIDTH}$ may be calculated upon beginning operations for each scan line 102*a–e*, thus the subtraction may be unnecessary.

Based on the width value $X_{WIDTH}$, a precision value may be calculated by equation 7 as follows:

$$\text{Precision} = \text{Acceptable\_Error}/X_{WIDTH} \qquad \text{Eq. (7)}$$

A value for the Acceptable_Error term may be predetermined as part of an implementation.

In the per-triangle method, a precision value may be calculated for the entire triangle 100. The width value $X_{WIDTH}$ may is be calculated from a maximum difference between the X-axis values (e.g., X1, X2 and X3) of the three vertices 106*a–c*. The calculation may be performed during a setup stage for the triangle 100. The calculation may implement equation 8 as follows:

$$X_{WIDTH} = \text{Maximum } (|X1-X2|, |X2-X3|, |X3-X1|) \qquad \text{Eq. (8)}$$

After calculating the width value $X_{WIDTH}$, the precision value may be calculated by equation 7 above.

A variety of designs may be used to implement the adder circuits such as ripple carry, carry select, generate propagate, and the like. The type of adder design is generally not important to the present invention as the variable precision approach (and the resulting power savings) may be applied to many different designs. The adder may basically mask off the lower significant bits based upon a precision value calculated in a previous stage. The number of significant bits K beyond the decimal point may also be calculated from the precision value by equation 9 as follows:

$$K = |\log_2 \text{Precision}| \qquad \text{Eq. (9)}$$

For example, given a precision value=$\frac{1}{20}$, then K=5 and the mask value (in binary form) becomes 11111111.111110000000. In another example, given a precision value=$\frac{1}{100}$, then K=7 and the mask value (in binary form) becomes 11111111.111111100000.

Figure 2:
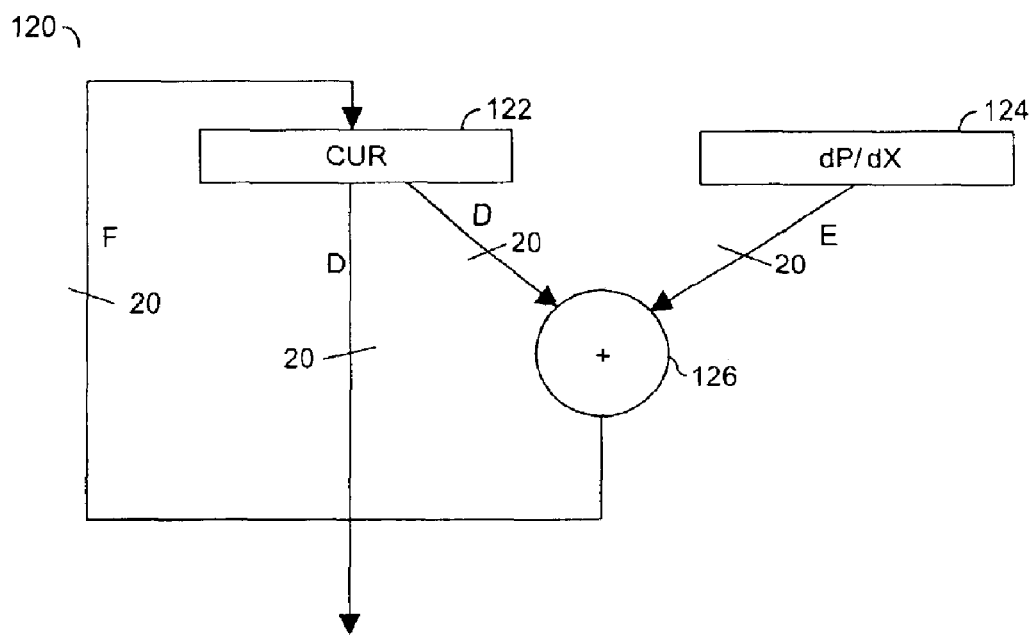
FIG. 2 is a block diagram of an example digital differential amplifier circuit.

Referring to FIG. 2, a block diagram of an example digital differential amplifier circuit 120 is shown. The DDA circuit 120 generally comprises a block or register 122, a block or register 124 and a block or adder circuit 126. The register 122 may be operational to store a value for a parameter P. The parameter P may be any one of the color, texture, depth or similar parameters. The stored value may be referred to as an old, existing or current value (e.g., CUR) of the parameter P. The register 122 may generate a signal (e.g., D) that conveys the current value CUR to the adder circuit 126. In one embodiment, the value CUR may be implemented as a 20-bit signal. Other signal widths may be implemented to meet the criteria of a particular application.

The register 124 may be operational to store a delta value dP/dx for the parameter P. The register 124 may generate a signal (e.g., E) that conveys the delta value dP/dX to the adder circuit 126. The delta value dP/dX may be implemented to have the same bit-width as the value CUR.

The adder circuit 126 may be implemented as a full adder circuit. The adder circuit 126 may generate a signal (e.g., F) by adding the values CUR and dP/dX from the signals D and E. The signal F may transfer a next or new value (e.g., NEW) to the register 122. The value NEW may be implemented to have the same bit-width as the value CUR.

For purposes of the following discussion, the values CUR, NEW and dP/dX for a parameter P may each be represented as a 20-bit number with an 8-bit whole value and a 12-bit decimal fraction value. In the case of an 8-bit color parameter, the signals E, F and D would transfer 8.12 fixed point numbers represented in the 20-bit registers 122 and 124 with an associated two-input 20-bit adder circuit 126. Multiple instantiations of the DDA circuit 120 for each parameter P of the triangle 100 may be implemented. Every clock cycle, the value stored in the register 122 may be incremented by the delta value dP/dX.

When implemented in a pixel pipeline, the register 122 may be initialized with an initial value CUR for the first pixel to be processed. Likewise, the register 124 may be initialized with an initial delta value dP/dX for the particular parameter of the pixel being processed. The DDA circuit 120 may hold and present the value CUR during a current cycle of the pipeline. The adder circuit 126 may calculate the value NEW for use in a subsequence pipeline cycle for a subsequent pixel 104. At the beginning of a subsequent cycle, the register 122 may load the value NEW in place of the value CUR. The beginning of each cycle may be defined by an edge of a clock signal (e.g., CLK). The register 122 may be responsive to the particular edge (e.g., rising or falling) of the clock signal CLK to load the value NEW. The clock signal CLK may be considered to have a clock value. Since the clock signal CLK has a bit-width of one, the clock value may alternate between a logical one and a logical zero.

Figure 3:
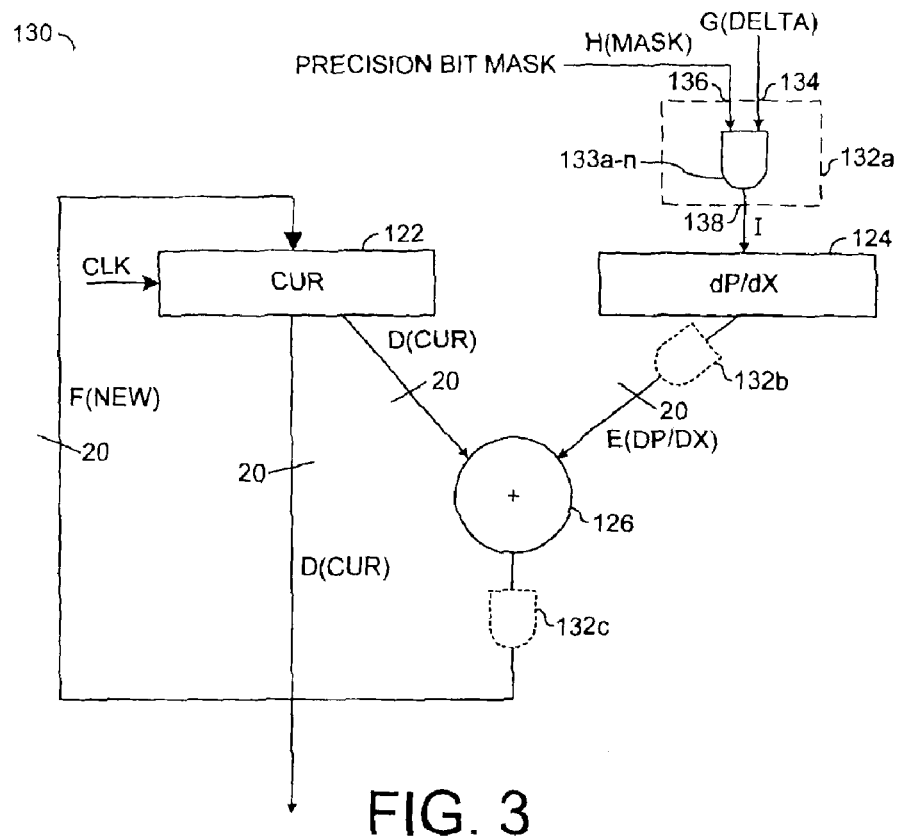
FIG. 3 is a block diagram of an example implementation of an apparatus in accordance with a preferred embodiment of the present invention.

Referring to FIG. 3, a block diagram of an example implementation of an apparatus 130 is shown in accordance with a preferred embodiment of the present invention. The apparatus 130 may be implemented as a DDA circuit. The DDA circuit 130 generally comprises the register 122, the register 124, the adder circuit 126, and a block or circuit 132a.

The circuit 132a generally comprises multiple logic gates 133a–n. Generally, a logic gate 133a–n may exist for each bit of the value MASK. Each logic gate may be implemented as a two-input logical AND gate. The circuit 132a may receive a signal (e.g., G) at an input 134. An input 136 of the circuit 132a may receive a signal (e.g., H). The circuit 132a may generate a signal (e.g., I) at an output 138. An input of each logic gate 133a–n may receive a bit from the signal I. The other input of each logic gate 133a–n may receive a bit from the signal G. The output of each logic gate 133a–n may form a bit of the signal I. Unmasked bits at the input 134 may be directly wired to corresponding bits at the output 138.

The signal G may carry a full-resolution delta value (e.g., DELTA) to convey the delta value dP/dX. The full-resolution delta value DELTA may have a bit-width equal to or greater than the delta value dP/dX. If the full-resolution delta value DELTA has a bit-width greater than that of the delta value dP/dx, one or more least significant bits in the decimal fraction portion of the value DELTA may not carry information from the delta value dP/dX. Therefore, the one or more least significant bits of the full-resolution delta value DELTA may be ignored (e.g., set to zero).

The signal H may carry a mask value (e.g., MASK) to control a variable precision feature of the DDA circuit 130. The value MASK may be implemented with a bit-width equal to or less than that of the delta value dP/dX. If the value MASK has a smaller bit-width than the delta value dP/dX, the least significant bit of the value MASK may be aligned with the least significant bit of the delta value dP/dX or the full-resolution delta value DELTA. One or more of the most significant bits of the delta value dP/dX may remain unaffected by the value MASK.

The signal I may carry the delta value dP/dX as masked by the value MASK. The delta value dP/dX may be implemented with a bit-width equal to or less than the value CUR. Generally, the decimal fraction portion of the delta value dP/dX may match bit-for-bit the decimal fraction portion of the value CUR.

Upon calculation of the full-resolution delta value DELTA and the value MASK, the mask circuit 130 may generate the signal I by masking the signal G with the signal H. In particular, the delta value dP/dX may be generated based upon a logical ANDing of the full-resolution delta value DELTA with the value MASK. For each bit of the value MASK having a logical one value, the corresponding bit in the delta value dP/dx stored in the register 124 may be set to the same bit in the full-resolution delta value DELTA. For each bit of the value MASK having a logical zero value, the corresponding bit in the delta value dP/dX may be set to the logical zero value regardless of the logical value in the same bit of the full-resolution delta value DELTA.

The value MASK may zero-out the lower bits of the delta value dP/dX prior to storing in the register 124. Where the lower bits of the delta value dP/dX are set to a logical zero, the circuitry within the adder circuit 126 that add the lower bits of the value CUR with the delta value dP/dX generally remains unchanged as the parameter P is updated across the current scan line 102. Thus, the adder circuit 126 may consume less power while some of the least significant bits of the delta value dP/dX are masked-out than if all of the bits in the delta value dP/dX are used to generate the value NEW. Furthermore, the register 122 may consume a lower than average power with some of the least significant bits masked-out since the circuitry within the register 122 storing the least significant bits may remain in a constant state (e.g., logical one or logical zero).

In one embodiment, the DDA circuit 130 may be implemented with the mask circuit 132b instead of the mask circuit 132a. The mask circuit 132b may have the same design as the mask circuit 132a but disposed in a different position. The mask circuit 132b may mask the full-precision delta value DELTA stored in the register 124 with the value MASK to generate the delta value dP/dX. In still another embodiment, the DDA circuit 130 may be implemented with the mask circuit 132c instead of the mask circuits 132a–b. The mask circuit 132c may have the same design as the mask circuit 132a. The mask circuit 132c may mask the value NEW calculated by the adder circuit 126 with the value MASK to generate a masked version of the value NEW.

In each embodiment, after a first iteration of adding, the lower bits may stop switching in the adder circuit 126 and remain the same through the remaining iterations across a scan line 102. In a design implementing the scan-line-per-scan-line precision calculation method and the mask circuit 132a at the input to the register 124, the delta value dP/dX may be reloaded with a correct precision value dP/dX masked for each scan line 102a–e of the triangle 100. In a design implementing the per-triangle precision calculation method, the mask circuit 132b and/or the mask circuit 132c, the full-precision delta value DELTA may be loaded into the register 124 once for the triangle 100 since the delta value presented by the register 124 may remain constant across all scan lines 102a–e for the entire triangle 100.

Figure 4:
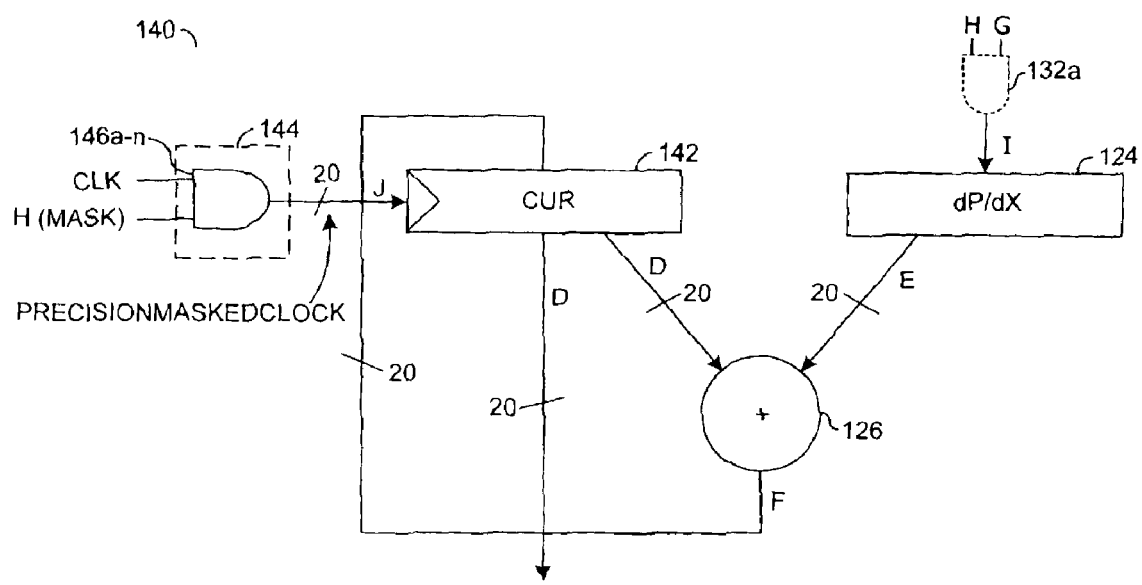
FIG. 4 is a block diagram of a second example implementation of an apparatus.

Referring to FIG. 4, a block diagram of a second example implementation of an apparatus 140 is shown. The apparatus 140 may be implemented as a DDA circuit. The DDA circuit 140 generally comprises a block or register 142, the register 124, the adder circuit 126 and a block or mask circuit 144.

The register 142 may be implemented as a multiple-bit wide register having an independent clock input for each bit. The register 142 may receive the value NEW within the signal F. The register 142 may generate the signal D carrying the value CUR.

The mask circuit 144 may receive the clock signal CLK. The mask circuit 144 may receive the signal H conveying the value MASK. The mask circuit 144 generally comprises multiple logic gates 146a–n. Each of the logic gates 146a–n may be implemented as a two-input logical AND gate. An input of each logic gate 146a–n may be wired together to receive the clock signal CLK. Thus, each logic gate 146a–n may be considered to receive one of several clock signals. The other input of each logic gate 146a–n may receive a bit of the signal H. The circuit 144 may generate multiple parallel clock signals substantially simultaneously. Each of the parallel clock signals may be gated active or inactive (e.g., forced to logical zero) by a corresponding bit from the value MASK. The logical values for the parallel clock signals as a group may be referred to as a clock value, with each of the parallel clock signals providing a bit to the clock value within a signal (e.g., J). The signal J may be presented to the multiple clock inputs of the register 142.

The parallel clock signal J generally has active bits for each whole bit of the value NEW to the left of the decimal point. The signal J may have some (e.g., reduced precision) or all (e.g., full precision) active bits for each decimal fraction bit of the value NEW to the right of the decimal point, depending on the value MASK. For each bit in the signal H having the logical zero value, the associated parallel clock signal may be forced to the logical zero value and not switched with the clock signal CLK. Therefore, the lower masked bits of the signal F may not be loaded into the register 142. If the lower masked bits in the register 142 do not change, the corresponding bits in the adder circuit 126 may not switch, thereby conserving power.

In one embodiment, the DDA circuit 140 may also include the mask circuit 132a. The mask circuit 132a may force the same lower bits to the logical zero value that the mask circuit 144 gates. Therefore, the lower masked bit in both the signals D and E may remain static across multiple clock cycles and iterations.

Figure 5:
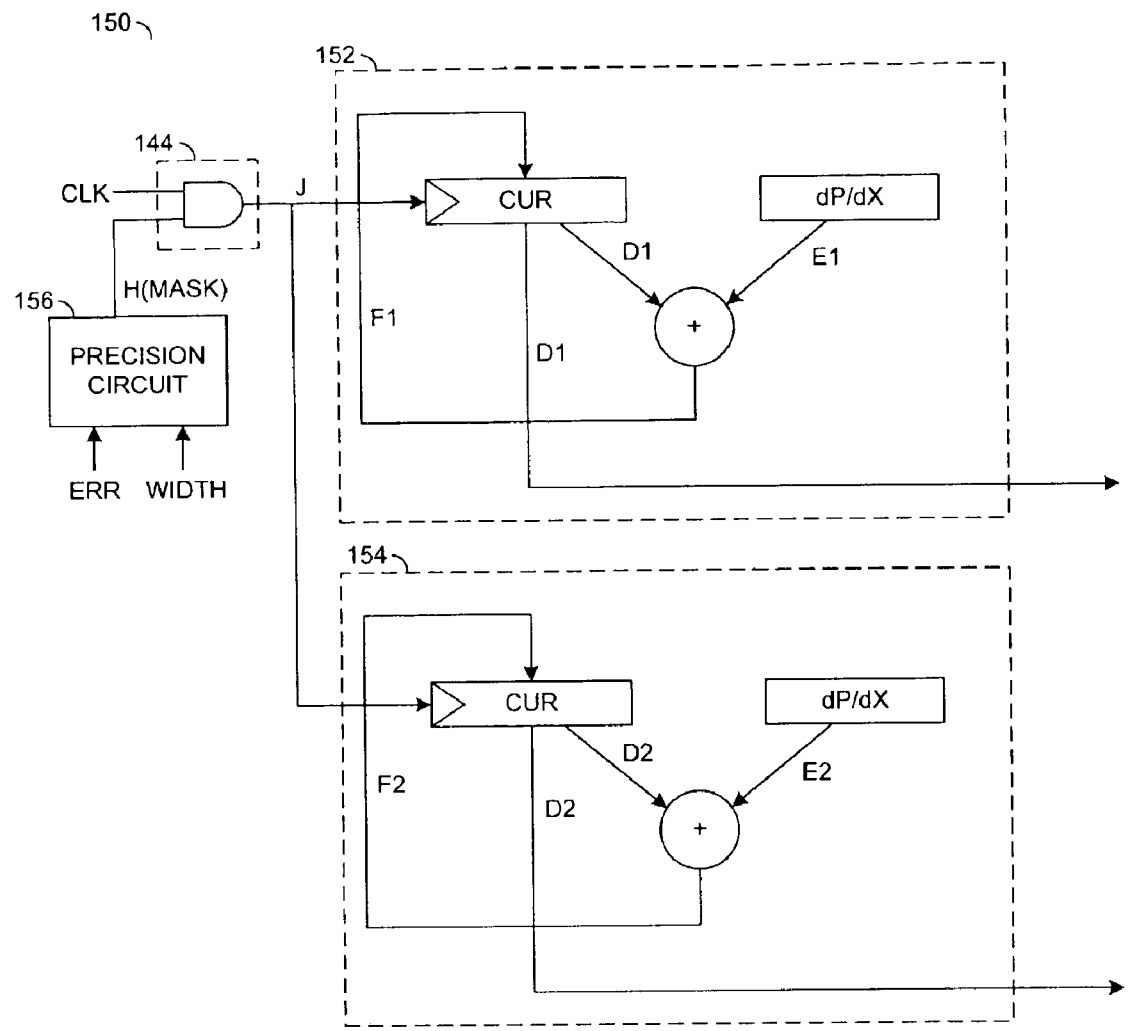
FIG. 5 is a block diagram of a third example implementation of an apparatus.

Referring to FIG. 5, a block diagram of a third example implementation of an apparatus 150 is shown. The apparatus 150 generally comprises a block or DDA circuit 152, a block or DDA circuit 154, the mask circuit 144 and a block or circuit 156. The circuit 156 may receive an error signal (e.g., ERR). The circuit 156 may receive a width signal (e.g., WIDTH). The circuit 156 may generate the signal H. The parallel clock signals J generated by the mask circuit 144 may be received by both the DDA circuit 152 and the DDA circuit 154.

A design of the DDA circuits 152 and 154 may be similar to the DDA circuit 140 with a shared mask circuit 144. The DDA circuit 152 may generate signals D1, E1 and F1 for a first parameter, similar to signals D, E and F of the circuit 140. The DDA circuit 154 may generate signals D2, E2 and F2 for a second parameter, similar to the signal D, E and F of the circuit 140.

The circuit 156 may be implemented as a precision calculating circuit, or precision circuit for short. The precision circuit 156 may receive the predetermined error value Acceptable_Error in the signal ERR. The value $X_{WIDTH}$ may be conveyed to the precision circuit 156 in the signal WIDTH. The precision circuit 156 may calculate the value MASK based upon the value Acceptable_Error and the value $X_{WIDTH}$ using equation 7 above.

The value MASK may be applied to the clock signal CLK to generate the parallel clock signals J. The parallel clock signals J may control storing of the value NEW for each parameter into the registers 144 in each DDA circuit 152 and 154. The value MASK may be used in common by multiple DDA circuits as long as each parameter has a similar minimum precision or the value MASK is generated for a most precise parameter being calculated.

The present invention generally takes advantage of masking the least significant bits to perform variable precision additions. The masking may optimize a number of bits being added by fixing insignificant lower significant bits to a predetermined value or state to prevent circuitry in the adder circuit 126 and/or register 122 from switching states. The fixed bits may lower an average power consumption of each DDA circuit resulting in a significant overall power reduction due to the highly repeated operations of a 3D graphics engine. Furthermore, the DDA circuits of the present invention may be used in other applications where high precision additions may performed only part of the time, with lower precision additions being performed the rest of the time and/or where many repeated additions may occur.

The various signals of the present invention are generally "on" (e.g., a digital HIGH, logical one or 1) or "off" (e.g., a digital LOW, logical zero or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. A 3D rendering apparatus comprising:
   a register configured to replace a current value with a new value in response to a clock value;
   an adder circuit configured to generate said new value by adding said current value to a delta value; and
   a mask circuit configured to mask at least one value among said delta value, said new value and said clock value in response to a mask value having a plurality of bits.

2. The apparatus according to claim 1, wherein said mask circuit is further configured to mask a subset of bits in said at least one value.

3. The apparatus according to claim 2, wherein said subset of bits comprises a decimal fraction for said at least one value.

4. The apparatus according to claim 1, further comprising a register disposed between said mask circuit and said adder circuit and configured to store said delta value.

5. The apparatus according to claim 1, wherein said mask circuit is further configured to mask at least two values among said delta value, said new value and said clock value.

6. The apparatus according to claim 5, wherein said at least two values comprise said delta value and said clock value.

7. The apparatus according to claim 1, wherein said mask circuit comprises:
   a plurality of logic gates configured to mask said clock value by gating a plurality of clock signals with said mask value.

8. The apparatus according to claim 7, wherein said mask circuit is further configured to:
   generate said clock signals from a single clock signal.

9. The apparatus according to claim 7, further comprising:
   a second register configured to replace a second current value with a second new value in response to said clock value; and
   a second adder circuit configured to generate said second new value by adding said second current value to a second delta value.

10. The apparatus according to claim 1, further comprising:
    a precision circuit configured to generate said mask value in response to a predetermined error value and a width value.

11. A method for operating a 3D rendering apparatus comprising the steps of:
    (A) generating a new value by adding a delta value to an current value;
    (B) replacing said current value with said new value in response to a clock value; and (C) masking at least one value among said delta value, said new value and said clock value using a mask value having a plurality of bits.

12. The method according to claim 11, wherein step (C) comprises the sub-step of:

masking a subset of bits in said at least one value.

13. The method according to claim 12, wherein said subset of bits comprises a decimal fraction for said at least one value.

14. The method according to claim 11, wherein step (C) comprises the sub-step of:

storing said delta value after masking said delta value.

15. The method according to claim 11, wherein said at least one value comprises at least two values among said delta value, said new value and said clock value.

16. The method according to claim 15, wherein said at least two values comprise said delta value and said clock value.

17. The method according to claim 11, wherein step (C) comprises the sub-step of:

masking said clock value by gating a plurality of clock signals with said mask value.

18. The method according to claim 11, further comprising the step of:

calculating said mask value in response to a distance across a graphically rendered object.

19. The method according to claim 18, further comprising the step of:

calculating said delta value in response to a change in a parameter along said distance.

20. A 3D rendering apparatus comprising:

means for generating a new value by adding a delta value to an current value;

means for replacing said current value with said new value in response to a clock value; and means for masking at least one value among said delta value, said new value and said clock value using a mask value having a plurality of bits.

* * * * *